Dec. 18, 1945.  E. L. SHAW  2,391,275
YIELD LINK
Filed March 4, 1943  2 Sheets-Sheet 2

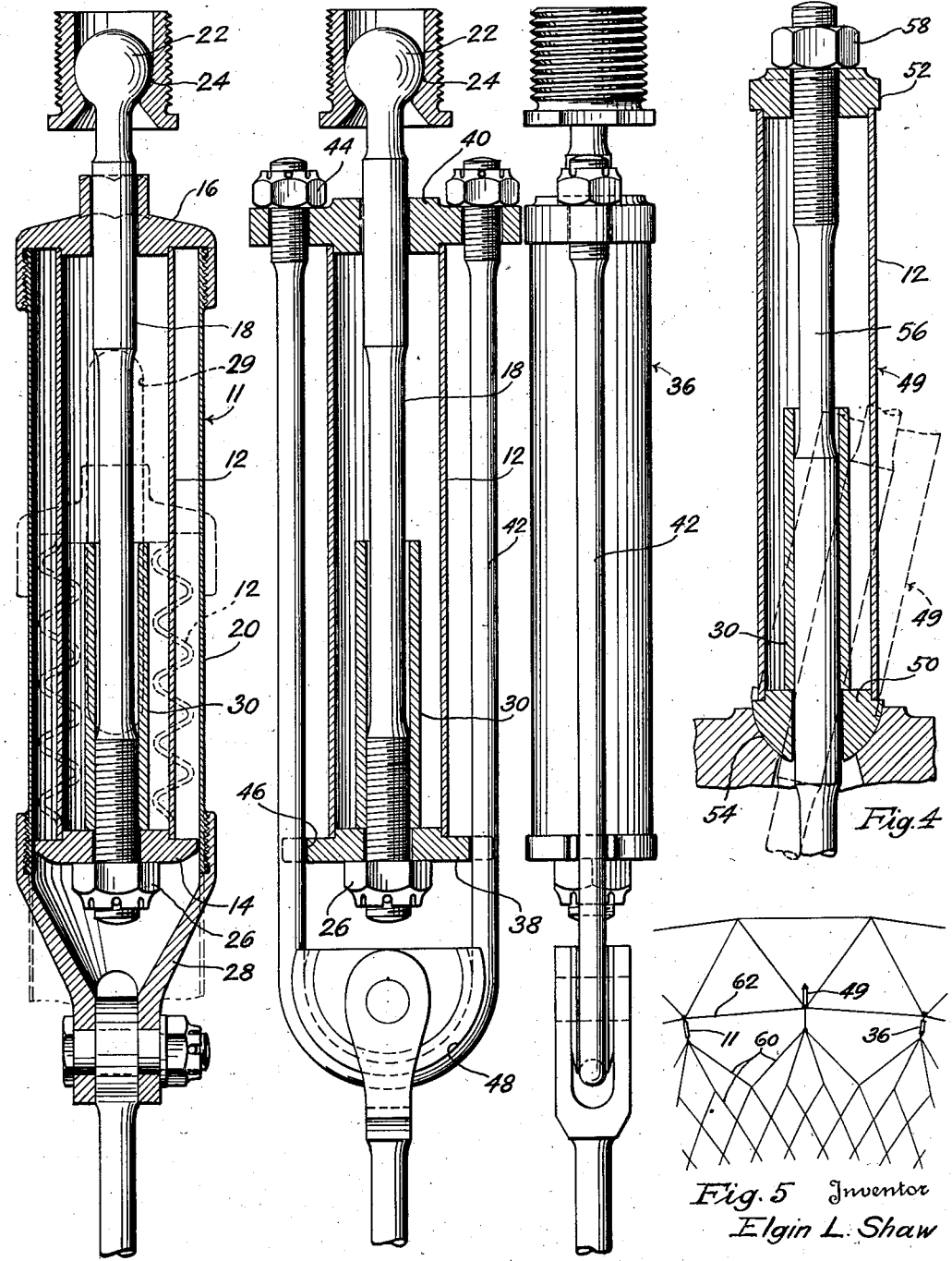

Inventor
Elgin L. Shaw

Attorney

Patented Dec. 18, 1945

2,391,275

UNITED STATES PATENT OFFICE 2,391,275

YIELD LINK

Elgin L. Shaw, Cuyahoga Falls, Ohio, assignor to Wingfoot Corporation, Akron, Ohio, a corporation of Delaware Application March 4, 1943, Serial No. 477,979

10 Claims. (Cl. 287—1)

This invention relates to the improvement of a yield link for structures and particularly to a device containing a yieldable compression member. Such a device may be used to good advantage for the protection of rigid airship structures, as well as superstructures of airplanes under overload conditions which might occur in exceptional circumstances. In fact, it may be used in any type of machine, apparatus or structure wherein certain parts require protection against excessive forces of either tension or compression.

It will be understood that in order to utilize the physical properties of the material in such structures economically, and with minimum weight, in some parts, stresses close to the yield point of the material must be allowed. However, to meet overload conditions and to prevent wrecking the structure, a safeguard for its protection becomes a necessity so that the structural stresses can always be kept within safe limits. For that purpose, yield links of large energy absorbing capacity are installed which come into operation before dangerous stresses in a structure can set up.

Yield links are known which, when under excessive tension, slowly give way, absorbing energy either by frictional engagement of certain parts or by various arrangements of resistant springs, fluid pressure cylinders, or the like. Those types of links, however, are somewhat expensive in production, because of relatively close tolerances required to obtain yielding at predetermined forces. Besides, there are several interdependent parts which must be machined to exact dimensions.

The construction according to this invention avoids this deficiency and has for its object a cheaper and simpler production and a more reliably functioning device.

Another object of this invention is the easy duplication of specimens having substantially identical physical properties.

Another object of this invention is the employment of only a single part independent of any other part of the device which accomplishes the yielding process and which permits quick exchangeability of the yield member when its renewal is required.

All these objects are obtained, according to this invention, by employing a compression type of link of the most simple construction. The yieldable part of this link consists of only a tubing made of ductile material like steel, copper, aluminum or its alloys, etc., which may be obtained on the market in finished tube form or which can be easily machined to exact and uniform dimensions with readily reproduceable physical properties of the desired quality. The same size tubing may be used for different yield forces by simply changing the length of the tube. In case of an overload the tube buckles at a predetermined force and destroys an energy equal to the force acting upon it times its reduction in length. Briefly stated, the invention finds its greatest utility in links for transmitting axial forces, either tension or compression, and wherein any excess forces so applied are dissipated by compressive resistance of a destructible yield member.

This construction is especially suitable as a link between an airship main ring and its transverse wire bracing or bulkhead which separates adjacent gas cells and which usually is mounted under tension. In the event of unequal gas pressure against the two sides of a bulkhead, most unfavorable in the case of a totally empty gas cell at one side of it, the radial stresses in the bulkhead, and, accordingly the compressive stresses in the ring structure to which it is attached may become unduly high. At a certain limit the yielding of these safety links immediately checks the increase of the structural forces to a reasonable amount.

Insofar as airplanes are concerned, the fuselage and its attachments may be protected against overstressing due to dangerous landing shocks by inserting yield links into some members of the undercarriage. In order to arrest the yielding process of such safety devices at a certain point a stop may be provided, if desired.

For a better understanding of this invention a more detailed description shall be given with reference to the accompanying drawings, wherein:

Figure 1 is a longitudinal cross-section through one form of yield link embodying the invention;

Figure 2 is a similar sectional view of a modified construction;

Figure 3 is a side view of the structure shown in Figure 2;

Figure 4 is a longitudinal cross-sectional view of a further modification of the invention;

Figure 5 is a diagrammatic fragmentary view of a main ring of an airship showing one practical application of this invention;

Figure 6:
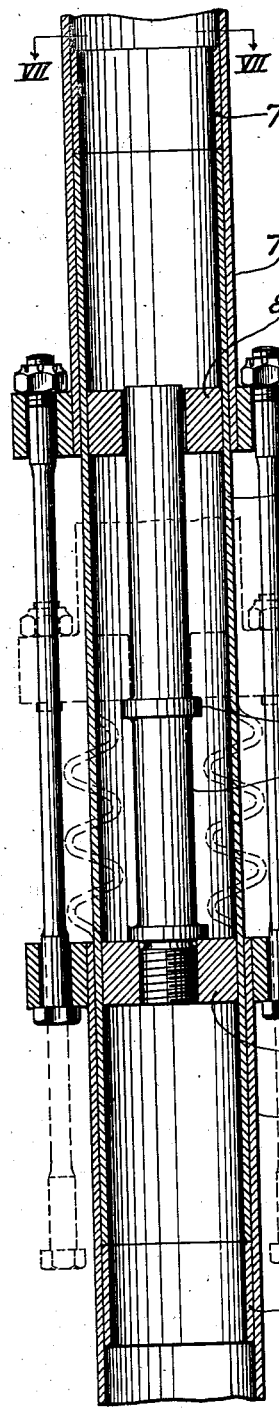
Figure 6 is a fragmentary longitudinal cross-sectional view of a strut including this invention.

In Figure 1, showing one embodiment of the invention, the numeral 11 designates a yield link as a whole of which 12 represents the yield member in the shape of a tubing made of any material suitable for the purpose. Abutments 14 and 16 are pressed against yield member 12, the former by a rod tension member 18 passing through the abutment 16 and the latter by a tubular tension member 20 forming a guide for the abutment 14. The tension member 18 is provided at one end with a ball 22 fitting into a socket 24 and is threaded at its other end which holds the nut 26 against the abutment 14, whereas the tension member 20 screws with one end into the abutment 16 and to its other end is screwed a clevis 28. The socket 24 is attached to one part of a structure and the clevis 28 to the other part of this structure to be connected. Each tension member forms a guide for the abutment supported by the other tension member so that the force to which the yield device is subjected will always go through the axis of the yield member. The tension member 20 is advantageously provided with longitudinal openings 29 for the purpose of an occasional inspection of the condition of the yield member. A stop 30 concentrically disposed in the device may be inserted for restricting the amount of deflection of the yield member shown by dotted lines in collapsed condition.

Figures 2 and 3 show a modification of the above-described construction, designated as a whole by the numeral 36, which consists of the yield member 12 held between abutments 38 and 40 by the rod tension member 18 of the former construction, and by a U-bolt tension member 42 taking the place of the tubular tension member 20 of Figure 1. The U-bolt 42 is anchored by nuts 44 against the abutment 40 and carries in its loop portion a thimble 48 attached to one part of a structure, whereas the socket 24 in which is anchored the tension member 18 is attached to the other part of this structure to be connected. The abutment 38 is provided with grooves 46 through which pass the legs of the U-bolt serving as guides for the abutment, thereby keeping the abutments always in proper alignment and the force acting upon the device in axial direction. A concentric stop 30 may be inserted in the device for limiting the deflection of the yield member.

Another modification of this invention is illustrated in Figure 4 and which is of the most simple construction, designated as a whole by the numeral 49. In this case the abutments 50 and 52, the first of which is of spherical shape and fits into a socket 54 of the structure, are forced against the yield member 12 by a single tension member 56 passing through the center of the yield member and being anchored against the abutment 52 by a nut 58. The spherical shape of the abutment 50 makes it possible for the yield link to deflect angularly, as shown in dotted lines, and to adapt itself to the changing direction of forces in that part of the structure to which the tension member is attached so that no other, but an axial force, can act upon the yield member. A control stop 30 for limiting the amount of deflection of the yield member, in case of collapse, may be inserted inside the yield member.

An example of a practical application of a yield link of the compression type as shown and described in three modifications is illustrated in Figure 5, in which a bulkhead 60 in a rigid airship (lighter-than-air) is connected to the ring structure 62 of the airship by means of yield devices 11, 36 and 49. Any of these constructions may be applied. The specimens 11 and 36, both of which extend between the ring structure and the bulkhead are using the same fitting for attachment of the bulkhead on the ring structure and, therefore, are directly interchangeable, whereas specimen 49 is disposed within the ring structure and requires a different fitting for its seat in the structure.

Figure 7:
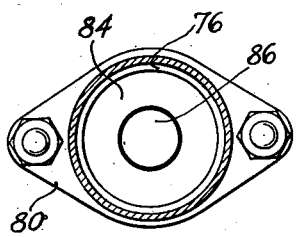
Figure 7 is a cross-sectional view taken on the line VII—VII of Figure 6.

In Figures 6 and 7 is illustrated a yield device, designated as a whole by the numeral 66, which is especially adapted for being incorporated in struts, for instance, of an airplane undercarriage to protect the superstructure against damage.

A yield member 70 telescoped with two separate strut parts 72 and 74, each of which having within and located some distance from their ends, a fixed abutment 76, is firmly united with these parts against the abutments by the tightening of bolts 78 against flanges 80 securely fastened to the strut parts. In case it is desired to limit the amount of deflection of the yield member, the yield member is provided inside with two disks 82 and 84 of which 82 carries a pin 86 and which can slide in the disk 84. This pin has located at any suitable distance from its free end, a shoulder 88 which serves as a stop for the deflection of the yield member. The yield member is shown in the drawings in collapsed position by dotted lines. In case of a collapse a yield member can be readily exchanged.

Figure 8:
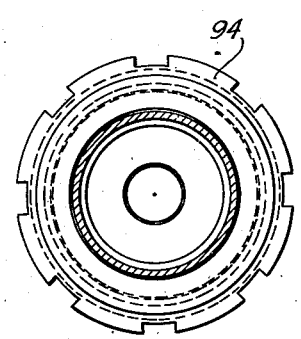
Figure 8 is a view similar to Figure 6 but showing another modified construction.
Figure 9:
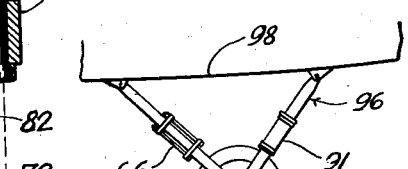
Figure 9 is a cross-sectional view taken on the line IX—IX of Figure 8.

A modification of the yield device just described is illustrated in Figures 8 and 9 and identified as an assembly by the numeral 91, with the only difference that the flanges 80 of Figure 6 are replaced by shoulder rings 92 and the bolts 78 by the sleeve union 94 exerting circumferentially a more uniform compression of the strut.

Figure 10:
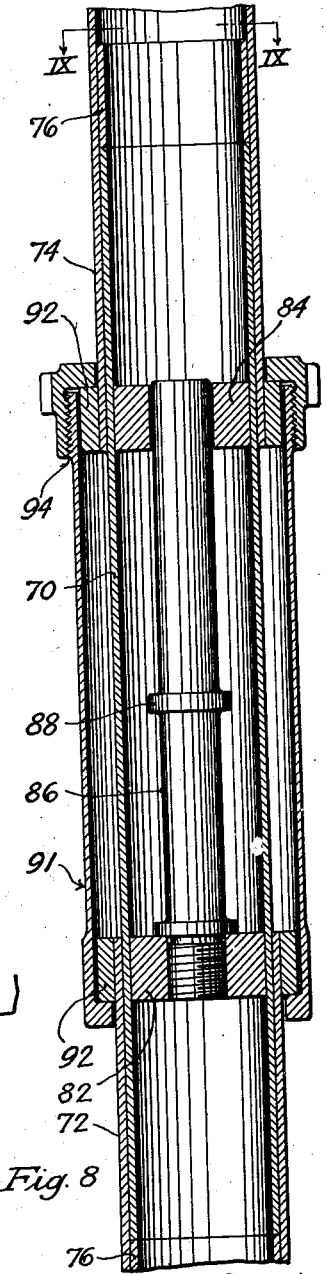
Figure 10 is a side view of an airplane undercarriage showing a practical application of this invention in such strut members.

These two constructions 66 and 91 are shown by example in Figure 10 as a practical application on an airplane undercarriage 96 attached to a fuselage 98.

From the foregoing description it will be apparent that this invention constitutes a decided improvement over previous constructions, since this type of yield device contains only a single member independent of any other part to accomplish the deformation process, and the physical properties of which can be easily duplicated. Due to the fact that the yield member is visible from the outside it can be readily inspected whenever desired.

Having now described this invention in detail by way of several examples illustrated, it is to be understood that I have shown only certain forms of this invention by way of illustration and that many variations may be made without in any way departing from the spirit of the invention and the scope of the appended claims.

I claim:

1. A yield link between two parts comprising a yield member of tubular cross section, a rod tension member connected to one of said parts, a U-shaped tension member connected to the other one of said parts, and an abutment attached to each one of the free ends of said tension members and compressing said yield member, the rod tension member passing through the U-bolt abutment and the U-bolt tension member passing through the rod abutment.

2. A yield member inserted between and extending inside two spaced parts of a rigid tubular member, a fixed abutment on the inside of each one of said parts, and means for uniting said parts by forcing said yield member against said abutments.

3. A yield member inserted between and extending inside two spaced parts of a rigid tubular member, a fixed abutment on the inside of each one of said parts, and bolts for uniting said parts by forcing said yield member against said abutments.

4. A yield member inserted between and extending inside two spaced parts of a rigid tubular member, a fixed abutment on the inside of each one of said parts, and a sleeve union for uniting said parts by forcing said yield member against said abutments.

5. A yield member in telescoped relation with two spaced parts of a rigid tubular member, a fixed abutment on each one of said parts, means for uniting said parts by forcing said yield member against said abutments, and a stop within said yield member to control the amount of yield under buckling condition.

6. A yield device between two parts comprising a yield member of tubular cross section, and an abutment at each end of said yield member, one of said parts pressing against one of said abutments and the other one of said parts pressing against the other one of said abutments, the outer face of one of said abutments being made spherically to permit angular deflection of the yielding device.

7. A yielding device between two parts, comprising a yield member of tubular cross section, an abutment at each end of said yield member, one of said abutments having a spherical face fitting loosely into one of said parts and the other one of said parts pressing against the opposite abutment to thus transmit pressure through said yield member upon the first one of said parts and permitting angular deflection of the yield device.

8. A yield link comprising a thin-walled metal tube, separate means engaging with an supporting internally each end of the tube, means adapted to apply compression forces to the separate means and to the tube, said tube resisting without deformation all normal compressive forces, but failing on overload with an accordion-like folding action, said separate means and the means for applying compression being positioned so as not to interfere with the accordion folding of the tube.

9. A yield link comprising a pair of spaced abutments, means mounting the abutments for movement towards each other, and a thin-walled metal tube gripped against its end faces by the abutments and under all normal action on the abutments holding them positively apart without yielding movement, said tube yielding on overload with an accordion-like folding action to allow movement together of the abutments.

10. A yield link between two parts, comprising attachment means adapted to be secured to the parts, an abutment provided for each one of said attachment means, a thin-walled tubular yield member seating at its end faces against said abutments and having both of its walls completely spaced from said attachment means along its yieldable length, said member resisting normal operating forces and buckling to reduced length under excessive operating forces.

ELGIN L. SHAW.